US005225381A

United States Patent [19]

Naya et al.

[11] Patent Number: 5,225,381

[45] Date of Patent: Jul. 6, 1993

[54] VACUUM SWITCH CONTACT MATERIAL AND METHOD OF MANUFACTURING IT

[75] Inventors: Eizo Naya; Mitsuhiro Okumura, both of Amagasaki, Japan

[73] Assignee: Mitsubishi Denki Kabushiki Kaisha, Tokyo, Japan

[21] Appl. No.: 874,373

[22] Filed: Apr. 27, 1992

Related U.S. Application Data

[62] Division of Ser. No. 592,791, Oct. 4, 1990, Pat. No. 5,130,068.

[30] Foreign Application Priority Data

Nov. 2, 1989 [JP] Japan .................................. 1-286916

[51] Int. Cl.[5] ......................... C04B 35/2; C04B 35/10; C04B 35/16

[52] U.S. Cl. .................................... 501/132; 501/126; 427/123; 75/228; 75/232; 200/144 B

[58] Field of Search ................ 501/126, 132; 427/123; 75/228, 232; 200/144 B

[56] References Cited

U.S. PATENT DOCUMENTS 3,438,724 4/1969 Hartford et al. .................... 501/132
4,686,338 8/1987 Kashiwagi et al. ................. 200/264
4,743,718 5/1988 Santilli ............................. 200/144 B
4,766,274 8/1988 Iyer et al. .......................... 200/144 B
4,971,866 11/1990 Naya et al. .......................... 428/614

FOREIGN PATENT DOCUMENTS 0336569 10/1989 European Pat. Off. .
215621 5/1983 Japan .

*Primary Examiner*—Mark L. Bell
*Assistant Examiner*—Michael Marcheschi

[57] ABSTRACT

A vacuum switch contact material consists essentially of a mixture of Cu and $Cr_xO_y$ (x=1 to 2, y=0 to 3) wherein $Cr_xO_y$ is in a particulate state, the center part of the particles consists of $Cr_2O_3$ (x=2, y=3), and the peripheral part of the particles consists of Cr (x=1, y=0). The $Cr_xO_y$ particles having $Cr_2O_3$ central part and Cr periphery can be formed by reducing the surface of $Cr_2O_3$ particles. Cu may be infiltrated into the open pores of $Cr_xO_y$ particles after a green compact of $Cr_2O_3$ is formed. Alternatively, a mixture of $Cr_2O_y$ particles and Cu particles may be formed into a green compact, which may then be sintered. Still alternatively, a mixture of $Cr_2O_y$ particles and Cu particles may be hot-pressed.

15 Claims, 4 Drawing Sheets

VACUUM SWITCH CONTACT MATERIAL AND METHOD OF MANUFACTURING IT

This application is a divisional of copending application Ser. No. 07/592,791, filed on Oct. 4, 1990, now U.S. Pat. No. 5,130,068. The entire contents of which are hereby incorporated by reference.

FIELD OF THE INVENTION

This invention concerns a vacuum switch contact material with excellent circuit-breaking performance and high withstand voltage, small chopping current and welding separation force (which means a force required for pulling apart both contacts melted together due to current), low wear, and stable performance.

BACKGROUND OF THE INVENTION

Contact materials used in vacuum switches have conventionally been made of, for example. Cu-Cr or Ag-WC. Of these, Cu-Cr for example has excellent circuit breaking performance and withstand voltage performance, but the chopping current is as high as 3 A or more, and the welding separation force is also high. On the other hand, Ag-WC for example has an excellent chopping current of about 1 A, but the circuit breaking performance is poor and withstand voltage is low. Cu-Cr contact materials are therefore used mainly in circuit breakers, while Ag-WC contact materials are mainly used in load breakers such as motors.

However, the use of different contact materials for different applications as described above necessitates handling of so many types, which is troublesome. In addition, structural modifications have to be made to vacuum switches if the contact material is changed, and likewise to the mechanism and structure of vacuum breakers.

Cu-$Cr_2O_3$ is also a known contact material, but as seen from FIG. 4 which is a schematic sectional view of the structure of this material, it has numerous closed pores or voids (7) which render its electrical performance unstable. In FIG. 4, (6) denotes $Cr_2O_3$ and (2) denotes Cu.

If for example this material is used to break large currents, the arc melts the contact surfaces. The surface part of the contact progressively wears down, and a situation in which a void containing residual gas is present close to the contact surface and a situation in which there is no such void close to the contact surface alternately appear. In the first mentioned situation the current breaking fails because the residual gas is blown out when the contact surface melts and the degree of vacuum in the vacuum switch is impaired (the pressure inside the vacuum switch increases). In the second mentioned situation, no gas is blown out upon melting of the contact surface, and the current breaking is therefore successful. Thus, when the device is used to break large currents repeatedly, it fails to perform whenever new voids are destroyed by melting of the overlying surface part of the contact.

If the device is used to break small currents, the arc produced is small and the contact surfaces do not melt as in the case of breaking large currents. However melting does occur in areas where the arc strikes, and if there are voids with residual gas at these points, this gas is released and adversely affects the withstand voltage performance.

The reason why these voids exist is that the wettability of $Cr_2O_3$ in Cu is extremely poor, and if the contacts are made by the usual techniques, it is very difficult to reduce the proportion of voids.

The authors of this invention have already carried out experiments with a view to developing contact materials that could satisfy all the above requirements. In for example Japanese Patent Application Kokai Publication No. 1984-215621, a Cu-Cr-$Cr_2O_3$ contact material is partially disclosed. Although this contact material gives excellent performance with a view to satisfying all the requirements, it was found in later experiments that its circuit breaking characteristics are not stable and its performance fluctuates.

Conventional vacuum switch contact materials did not therefore have all the requisite characteristics, and many kinds of materials had to be used for different applications in order that inferior characteristics did not impair contact performance. Further, even if a contact material did have all the requisite characteristics, it lacked stability.

SUMMARY OF THE INVENTION

This invention was devised to solve the above problems. It aims to provide a vacuum switch contact material with excellent circuit breaking performance and withstand voltage performance, low chopping current, low welding separation force and low wear, and a method of manufacturing said material.

This invention provides:

a vacuum switch contact material comprised of Cu and $Cr_xO_y$ (x=1 to 2, y=0 to 3) wherein $Cr_xO_y$ is in a particulate state, the center part of the particles consists of $Cr_2O_3$ (x=2, y=3), and the peripheral part of the particles consists of Cr (x=1, y=0);

a method of manufacturing a vacuum switch contact material wherein a green compact of $Cr_2O_3$ powder is heat-treated in a hydrogen atmosphere to reduce the surface of the particles of the $Cr_2O_3$ powder to Cr, and Cu is infiltrated into the pores of the green compact so obtained;

a method of manufacturing a vacuum switch contact material wherein $Cr_2O_3$ powder is heat-treated in a hydrogen atmosphere to reduce the surface of the particles of the $Cr_2O_3$ powder to Cr, a green compact is formed from the powder obtained, and Cu is infiltrated into the pores of the green compact;

a method of manufacturing a vacuum switch contact material wherein $Cr_2O_3$ powder is heat-treated in a hydrogen atmosphere to reduce the surface of the particles of the $Cr_2O_3$ powder to Cr, a green compact is formed from a mixture of the powder obtained and Cu powder, and the green compact is then sintered; and a method of manufacturing a vacuum switch contact material wherein $Cr_2O_3$ powder is heat-treated in a hydrogen atmosphere to reduce the surface of the particles of the $Cr_2O_3$ powder to Cr, a mixture of the powder thus obtained and Cu powder is filled in a die, and the product is hot-pressed at a temperature below the melting point of Cu.

DETAILED DESCRIPTION OF THE EMBODIMENTS

Figure 1A:
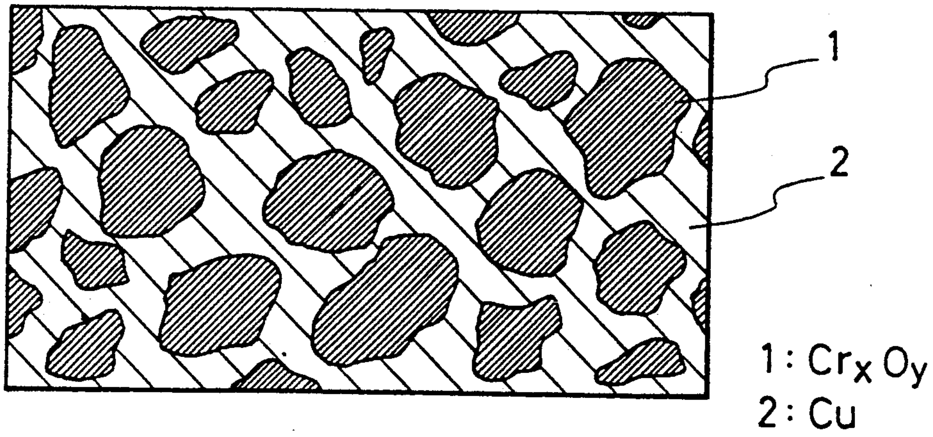
FIG. 1A is a schematic sectional view of the structure of the contact material of this invention.

As shown in FIG. 1A, the vacuum switch contact material of this invention is comprised of Cu (2) and $Cr_xO_y$ (x=1 to 2, y=0 to 3) (1). FIG. 1A is a schematic sectional view of the structure of the contact material.

Said $Cr_xO_y$ is in a particulate state, and the center part of these particles consists of $Cr_2O_3$. In order to attain good wettability with Cu, the peripheral area of the particles is in the form of Cr.

Figure 1B:
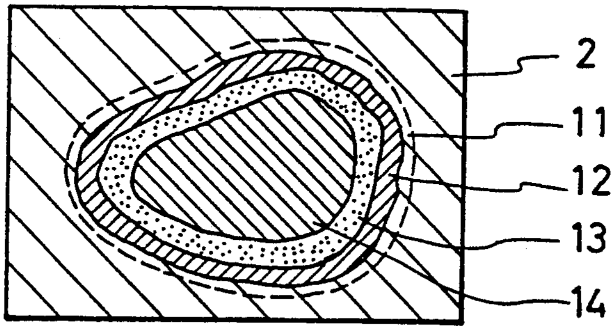
FIG. 1B is a schematic sectional view in greater detail of a $Cr_xO_y$ particle and the area surrounding it shown in FIG. 1A.

As seen for example from FIG. 1B which gives a schematic view of a section of a particle, the center part consists of $Cr_2O_3$ (14), and there are a layer consisting of a mixture of CrO and $Cr_2O_3$ (13) and then a layer of Cr (12) outside the center part. In addition, due to contact with Cu (2), there is usually a reactive layer (11) on the surface of Cr layer (12) formed by reaction of Cr and Cu. In practice, however, there is no clear boundary between these layers but instead, a gradual transition from $Cr_2O_3$ to Cr.

It is therefore not possible to determine the thickness of each of the layers, and there is no particular limitation on their thickness. The average size of the $Cr_xO_y$ particles is preferably 0.5 to 3 μm.

The proportion of $Cr_xO_y$ in the contact material is preferably 10 to 65 volume %, but more preferably 34 to 60 volume %. If said proportion is less than 10 volume %, circuit breaking performance tends to decline and chopping current tends to increase: and if the proportion exceeds 60 volume %, circuit breaking performance tends to decline.

As already mentioned, the peripheral part of the $Cr_xO_y$ particles in the contact material of this invention consists of Cr which has good wettability with Cu. It is therefore very difficult for voids to exist in its structure, and the proportion of voids in the material is normally no more than 2%.

As there are very few voids in the contact material of this invention, therefore, it always has a stable breaking performance with respect to large currents, a stable withstand voltage performance and a low chopping current. The welding separation force is also small, and there is little wear.

We shall now describe four methods of manufacturing the contact material of this invention.

In the first manufacturing method, a green compact of $Cr_2O_3$ powder is heat-treated in a hydrogen atmosphere to reduce the surface of the particles of the $Cr_2O_3$ powder to Cr, and Cu is infiltrated into the open pores of the green compact so obtained.

Said $Cr_2O_3$ powder should preferably have a purity of no less than 99% and an average particle size of 0.5 to 3 μm.

Said green compact may be formed by any of the usual methods such as, for example, a die press.

From the viewpoint of reducing $Cr_2O_3$, the atmosphere in said heat treatment should preferably be hydrogen. The supply gas should preferably have a dew point not higher than −60° C., and from the viewpoint of processing time or generation of $H_2O$ by reduction, it should preferably have a dew point not higher than −90° C.

The temperature of said heat treatment should preferably be 1000° C. or more, and from the viewpoint of processing time, it should lie in the range 1200° to 1300° C. The processing time should preferably be 0.5 to 1 hour.

There is no particular limitation on the method used to infiltrate Cu into the open pores of said green compact. Copper may for example be placed on said green compact which has been heat-treated, and the assembly is heated in an atmosphere of hydrogen to melt the Cu so that Cu is infiltrated into the open pores of the green compact.

During this infiltration, the heating temperature is generally 1200° to 1300° C., and the heating time is preferably 0.5 to 1 hour.

In the second manufacturing method, $Cr_2O_3$ powder is heat-treated in a hydrogen atmosphere to reduce the surface of the particles of the $Cr_2O_3$ powder to Cr, a green compact is formed from the powder obtained, and Cu is infiltrated into the open pores of the green compact.

Said $Cr_2O_3$ powder is the same as that used in the first manufacturing method.

The conditions of said heat treatment may be the same as those of the first manufacturing method.

Said green compact may be formed by any of the usual methods such as, for example, a die press.

If large particles are formed of powder of $Cr_2O_3$ having the surface reduced, it is preferable that they be broken up in a ball mill or similar device before use.

The method of infiltrating Cu into the open pores of said green compact may be the same as that of the first manufacturing method.

In the third manufacturing method, $Cr_2O_3$ powder is heat-treated in a hydrogen atmosphere to reduce the surface of the particles of the $Cr_2O_3$ powder to Cr, a green compact is formed from a mixture of the powder obtained and Cu powder, and the green compact is then sintered.

The $Cr_2O_3$ powder and the method of reducing the surface of the particles of the $Cr_2O_3$ powder to Cr may be the same as those of the second manufacturing method.

The $Cr_2O_3$ powder from reduction of said surface and Cu power may be mixed by any of the usual methods such as, for example, a ball mill.

Said Cu powder should preferably have a purity of no less than 99% and an average particle size of 1 μm.

Said green compact may be formed by any of the usual methods such as, for example, a die press.

There is no particular limitation on the method used to sinter said green compact, but the sintering temperature should preferably be in the region of the melting point of Cu, 1000° to 1100° C., and the sintering time should preferably be 2 to 3 hours.

The atmosphere may be a hydrogen gas atmosphere or a vacuum.

In the fourth manufacturing method, $Cr_2O_3$ powder is heat-treated in a hydrogen atmosphere to reduce the surface of the particles of the $Cr_2O_3$ powder to Cr, a mixture of the powder obtained and Cu powder is filled in a die, and the product is hot-pressed at a temperature below the melting point of Cu.

The $Cr_2O_3$ powder, the method of reducing the surface of the particles of said $Cr_2O_3$ powder to Cr, and the method of mixing the reduced powder with Cu powder, may be the same as in the third manufacturing method.

There is no particular limitation on the die used as a hot press, but it may for example be a carbon die.

The temperature of said hot press should not be greater than the melting point of Cu, but from the viewpoint of processing time, it should preferably be in the range 950° to 1050° C. The pressure of the hot press should preferably be 100 to 500 kg/cm$^2$, and the pressing time 0.5 to 1 hours. The atmosphere used should preferably be hydrogen or a vacuum, and if it is a vacuum, the pressure should be no greater than $10^{-3}$ Torr to prevent oxidation.

We shall now describe the contact material and manufacturing methods of this invention in more detail with reference to specific examples, but it should be understood that the invention is not limited to them in any way.

EXAMPLE 1

$Cr_2O_3$ powder (average particle size 1 μm, purity 99%; hereinafter same) was molded in a die press under a pressure of 1000 kg/cm$^2$ so as to obtain a green compact with 50% porosity. This green compact was heat-treated in a hydrogen atmosphere at 1300° C. for 0.5 hours to reduce the surface of the particles of the $Cr_2O_3$ powder comprising the green compact, and the green compact was polished. When the green compact was analyzed by an X-ray micro-analyzer (XMA), the surface of particles of the $Cr_2O_3$ powder was found to be without oxygen, and oxygen was found in the center part of the particles.

Next, 99.8% pure Cu was placed on the heat-treated green compact, and the temperature was maintained at 1250° C. in a hydrogen atmosphere for 1 hour to melt the Cu and infiltrating it into the open pores of the green compact. This gave a contact material.

The proportion of $Cr_2O_3$ in the contact material obtained (value in the unreduced state; hereinafter same) was 60% by volume. When the density (ratio of the actual specific gravity to the theoretical specific gravity, i.e., the specific gravity which would result if there are no pores) of the green compact obtained was measured, it was found to be 98.3% and the proportion of voids was no greater than 2%.

EXAMPLE 2

$Cr_2O_3$ powder was heat-treated in a hydrogen atmosphere at 1300° C. for 0.5 hours to reduce the surface of the particles of the $Cr_2O_3$ powder.

After this heat treatment, the powder obtained was crushed in a ball mill and particulate material was broken up. This powder was then molded in a die press under a pressure of 1000 kg/cm$^2$, and a green compact with 50% porosity was obtained. 99.8% pure Cu was then placed on the heat-treated green compact, and the temperature was maintained at 1250° C. in a hydrogen atmosphere for 1 hour to melt the Cu and infiltrate it into the open pores of the green compact. This gave a contact material.

The proportion of $Cr_2O_3$ in the contact material obtained was 60% by volume, and the proportion of voids was no greater than 2%.

EXAMPLE 3

$Cr_2O_3$ powder of which the particle surface had been reduced as in Example 2, was prepared. Next, said $Cr_2O_3$ powder was mixed with Cu powder (average particle size 1 μm, purity 99%; hereinafter same) in a ball mill, and the mixture was molded in a die press under a pressure of 3000 kg/cm$^2$ to give a green compact with 25% porosity. This green compact was sintered in a hydrogen atmosphere in the region of 1083° C. for 3 hours so as to obtain a contact material.

The proportion of $Cr_2O_3$ in the contact material obtained was 25% by volume, and the proportion of voids was no greater than 2%.

EXAMPLE 4

$Cr_2O_3$ powder of which the particle surface had been reduced as in Example 3 was mixed with Cu powder, packed into a carbon die, and maintained in a vacuum of $10^{-3}$ Torr at 1050° C. under a pressure of 200 kg/cm$^2$ for 3 hours.

The proportion of $Cr_2O_3$ in the contact material obtained was 40% by volume, and the proportion of voids was no greater than 1%.

COMPARATIVE EXAMPLE 1

$Cr_2O_3$ powder was molded in a die press under a pressure of 1000 kg/cm$^2$ to give a green compact with 50% porosity. 99.8% pure Cu was placed on this green compact in a hydrogen atmosphere, and the temperature was maintained at 1250° C. for 1 hour to melt the Cu and infiltrate it into the open pores of the green compact. Although the Cu melted, the molten Cu remained at the periphery of the green compact and was not infiltrated into the interior.

COMPARATIVE EXAMPLE 2

25 g of $Cr_2O_3$ powder and 75 g of Cu powder were mixed in a ball mill, and then molded in a die press under a pressure of 3000 kg/cm$^2$ to give a green compact with 25% porosity. This green compact was sintered in a hydrogen atmosphere at 1050° C. for 3 hours so as to obtain a contact material.

The proportion of voids in this contact material was 12%.

COMPARATIVE EXAMPLE 3

A green compact was prepared by the same method as in Comparative Example 2, and sintered in a hydrogen atmosphere at 1100° C. for 3 hours. Although, the Cu in the green compact melted, it burst out from the green compact and the Cu and $Cr_2O_3$ separated.

COMPARATIVE EXAMPLE 4

After preparing a mixed powder as in Comparative Example 2, it was filled in a carbon die and maintained in a vacuum of $10^{-3}$ Torr at 1050° C. under a pressure of 200 kg/cm$^2$ for 3 hours.

The resultant contact material contained 7% voids.

From Examples 1 to 4 and Comparative Examples 1 to 4, it is seen that according to the method of this invention, a contact material can be manufactured with a low proportion of voids within 2%, whereas in the conventional methods, the proportion of voids cannot be kept low.

One reason why the proportion of voids cannot be made small using conventional methods is that the wettability of Cu in $Cr_2O_3$ is very poor. If the Cu is melted, therefore, it bursts out of the $Cr_2O_3$ green compact, and if the Cu is not melted, sintering does not proceed satisfactorily.

It was already stated that the contact material of this invention has stable electrical properties, and we shall now describe this in more detail.

EXAMPLE 5

Contact materials with various $Cr_2O_3$ contents were manufactured in the same way as Examples 1 to 4 excepting that the proportions of Cu and $Cr_2O_3$ powder were varied. As Methods 1 and 2 described in Examples 1 and 2 are infiltration methods, they are suitable for the manufacture of contact materials where the quantity of Cu does not exceed 60 volume %. Methods 3 and 4 described in Examples 3 and 4, on the other hand, are suitable for the manufacture of contact materials where the quantity of Cu is greater than 60 volume %. Materials containing less than 60 volume % of Cu were therefore manufactured by Methods 1 and 2 (materials with similar properties are obtained by both methods); materials containing 60 volume % of Cu were manufactured by Methods 1 to 4 (materials with similar properties are obtained by all of these methods); and materials containing more than 60 volume % of Cu were manufactured by Methods 3 and 4 (materials with similar properties are obtained by both methods).

After these contact materials were machined into the shape of electrodes, they were assembled in a vacuum switch tube, and this vacuum switch tube was fitted to a switching mechanism so as to make a vacuum circuit breaker. Using this breaker, various electrical properties were examined by the methods described below. Circuit breaking performance is shown in FIG. 2, and chopping current performance is shown in FIG. 3.

Figure 2:
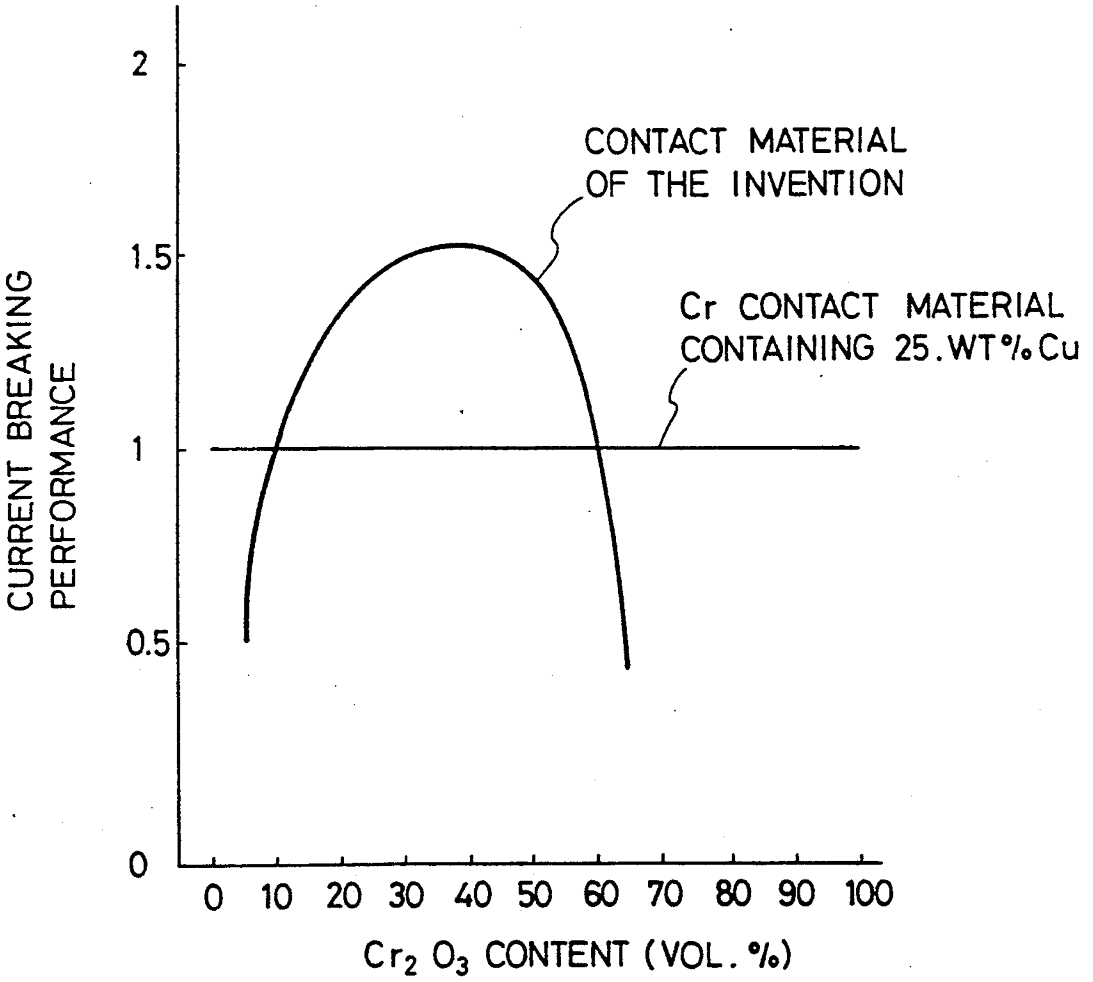
FIG. 2 is a graph showing the circuit breaking performance of the contact material of this invention.

In FIG. 2, the vertical axis shows the value of the breaking current obtained with respect to the current obtained with a conventional Cu-25 weight % Cr contact material used as a circuit breaker, and the horizontal axis shows the proportion of $Cr_2O_3$ in the contact material.

Figure 3:
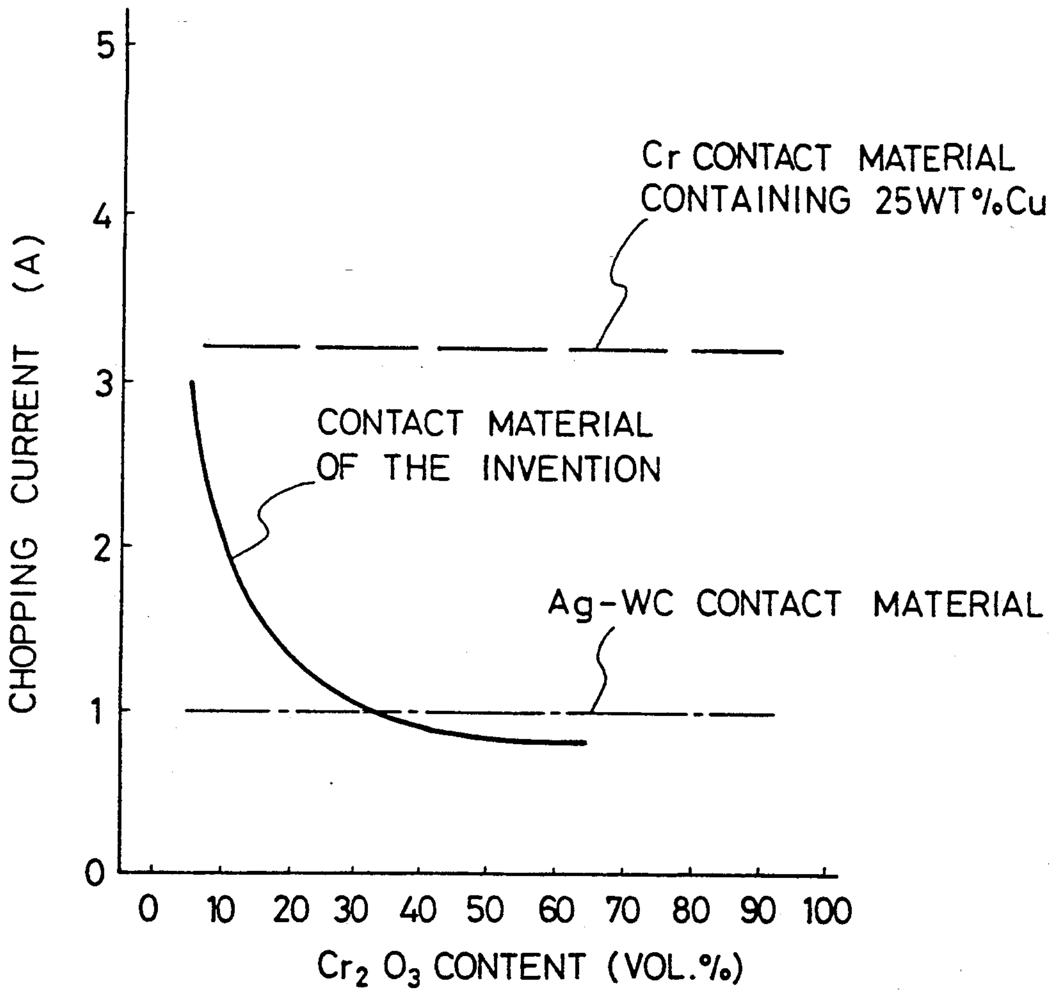
FIG. 3 is a graph showing the chopping current performance of the contact material of this invention.
Figure 4:
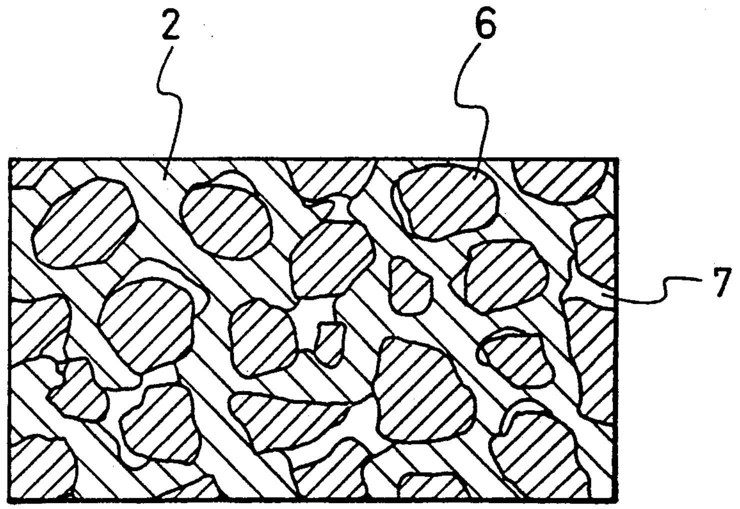
FIG. 4 is a schematic sectional view of the structure of a conventional contact material.

In FIG. 3, the vertical axis shows chopping current, and the horizontal axis shows the proportion of $Cr_2O_3$.

Circuit Breaking Performance

The final current for which breaking was successful in a single-phase synthetic breaking test where the voltage was 7.2 kV and the current was increased in steps of 2.5 kA was taken as the critical breaking capacity.

Chopping Current Performance

A current of 20 A was switched on and off, and the value of the current when chopping occurred was measured.

From FIG. 2, it is seen that the circuit breaking performance of the contact material of this invention surpasses that of a conventional Cu-25 weight % Cr contact material when the $Cr_2O_3$ content is within the range 10 to 60 volume %, and that it has a peak in the region of 40 volume %.

Further, from FIG. 3, it is seen that the value of the chopping current of the contact material of this invention is far lower than that of a conventional Cu-25 weight % Cr contact material, and even compared with a conventional Ag-WC contact material, its performance is superior when the $Cr_2O_3$ content is 33 volume % or more.

Concerning other electrical properties, it was found that withstand voltage was equivalent to that of a conventional Cr contact material containing 25 weight % of Cu, welding separation force was such that the material could be tripped at only ¼ of the force required for a conventional Cu-25 weight % Cr contact material, and wear was only 0.1 mm even after 10,000 switching operations.

As stated above, the vacuum switch contact material of this invention is comprised of Cu and $Cr_xO_y$ (x=1 to 2, and y=0 to 3), the $Cr_xO_y$ consisting of $Cr_2O_3$ in the center part of the $Cu_2O_3$ particles and of Cr in the peripheral part. The material therefore has an excellent circuit breaking performance, a low value of chopping current and welding separation force, low wear, and stable characteristics. Further, according to the manufacturing method of this invention, the proportion of voids is small, and a contact material with excellent properties can thus be manufactured as described above.

What is claimed is:

1. A vacuum switch contact material comprising a mixture of Cu and $Cr_xO_y$ (x=1 to 2, y=0 to 3) wherein $Cr_xO_y$ is in a particulate state, a center part of the particles consisting essentially of $Cr_2O_3$ (x=2, y=3), and a peripheral part of the particles consisting essentially of Cr (x=1, y=0).

2. The contact material of claim 1, wherein the $Cr_xO_y$ particles are dispersed in the Cu particles.

3. The contact material of claim 1, wherein an average size of the $Cr_xO_y$ particles is 0.5 to 3 μm.

4. The contact material of claim 1, wherein a proportion of $Cr_xO_y$ in the mixture is 10 to 65% by volume.

5. The contact material of claim 4, wherein said proportion is 34 to 60% by volume.

6. The contact material of claim 1, wherein a percentage of voids in said contact material is less than 2%.

7. The contact material of claim 6, wherein said contact material has high circuit breaking performance, low chopping current, low welding separate force, low wear, and stable characteristics.

8. A vacuum switch contact material comprising a mixture of Cu and $Cr_xO_y$ (x=1 to 2, y=0 to 3) particles, said $Cr_xO_y$ particles including,
a center part consisting essentially of $Cr_2O_3$,
an intermediate part consisting essentially of CrO and $Cr_2O_3$, and
a peripheral part consisting essentially of Cr,
wherein a gradual transition from the $Cr_2O_3$ center part to the Cr peripheral part exists.

9. The vacuum switch contact material of claim 8, said $Cr_xO_y$ particles further including a reactive layer consisting essentially of Cr and Cu surrounding the peripheral part.

10. The contact material of claim 8, wherein the $Cr_xO_y$ particles are dispersed in the Cu particles.

11. The contact material of claim 8, wherein an average size of the $Cr_xO_y$ particles is 0.5 to 3 μm.

12. The contact material of claim 59, wherein a proportion of $Cr_xO_y$ in the mixture is 10 to 65% by volume.

13. The contact material of claim 12, wherein said proportion is 34 to 60% by volume.

14. The contact material of claim 8, wherein a percentage of voids in said contact material is less than 2%.

15. The contact material of claim 14, wherein said contact material has high circuit breaking performance, low chopping current, low welding separate force, low wear, and stable characteristics.

* * * * *